(12) United States Patent
Sakamoto et al.

(10) Patent No.: US 6,185,212 B1
(45) Date of Patent: Feb. 6, 2001

(54) ATM CELL PROCESSING APPARATUS

(75) Inventors: Kenichi Sakamoto, Tokyo; Akio Makimoto, Yokohama; Akihiko Takase, Tokyo; Norihiko Moriwaki, Kokubunji; Atsushi Kiuchi, Higashimurayama, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/056,770

(22) Filed: Apr. 8, 1998

(30) Foreign Application Priority Data

Apr. 8, 1997 (JP) .................................................... 9-089070

(51) Int. Cl.[7] .................................................. H04L 12/28
(52) U.S. Cl. ............................................ 370/395; 370/412
(58) Field of Search .................................. 370/395–399, 370/412

(56) References Cited

U.S. PATENT DOCUMENTS

| 5,099,475 | * | 3/1992 | Kozaki et al. | 370/422 |
| 5,214,642 | * | 5/1993 | Kunimoto et al. | 370/471 |
| 5,768,274 | * | 6/1998 | Murakami et al. | 370/395 |
| 5,818,853 | * | 10/1998 | Nakano et al. | 714/751 |
| 5,825,710 | * | 10/1998 | Jeng et al. | 365/230.03 |
| 5,920,559 | * | 7/1999 | Awaji | 370/392 |

FOREIGN PATENT DOCUMENTS 7-183887   7/1995 (JP) .

OTHER PUBLICATIONS

Kozaki et al. "32×32 Shared Buffer Type ATM switch VLSIS for B–ISND"; Jun. 23–26, 1991; IEEE International conference on Communication.*
"Standard ATM Text", published by ASCII company on Mar. 1995, p. 109, p. 63.
"VLSI memory" published by Baifukan in Nov. 1994, pp. 101–110.

* cited by examiner

*Primary Examiner*—Huy D. Vu
*Assistant Examiner*—Jasper Kwoh
(74) *Attorney, Agent, or Firm*—Antonelli, Terry, Stout & Kraus, LLP

(57) ABSTRACT

An ATM cell processing apparatus including a DRAM for a frame producing buffer of a frame producing unit. In order to absorb the anisotropy of the access rate of the DRAM access, the random access mode of the DRAM access is always used. To compensate a drop in access rate in this case, the DRAM is arranged is an array form and each cell is divided. Resultant partial cell data are written into and read from respective DRAM banks in order. As a result, a fast cell buffer having a large capacity can be formed. The present cell buffer can be applied to a FIFO and the like as well.

16 Claims, 14 Drawing Sheets

ADDRESS CONFIGURATION OF
FRAME PRODUING BUFFER
(WAD、RAD)

THE CASE WHERE
THE NUMBER OF CONNECTIONS IS 4096,
THE NUMBER OF FRAME BUFFERS PER
CONNECTION IS 2,AND
MAXIMUM FRAME LENGTH IS BYTES
(APPROXIMATELY 31 CELLS)

FIG. 5
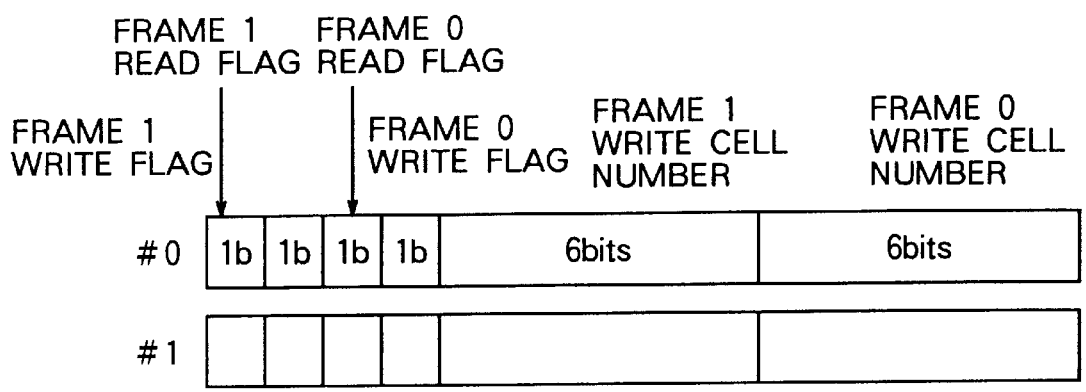
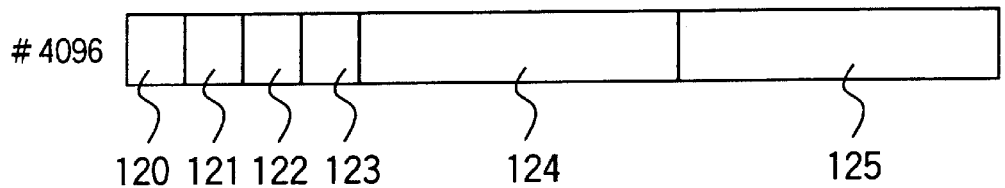
READ FLAG : 1 UNDER READ WAIT
WRITE FLAG : 1 UNDER WRITING
WRITE CELL NUMBER : BUFFER AREA IN WHICH
   CELL SHOULD RE SUBSEQUENTLY
   WRITTEN IS INDICATED
MANAGEMENT INFORMATION
BUFFER BIT MAP (a) ①②⑥⑦ : WRITE CELL INTO FRAME 0
(b) ③④⑤ : WRITE CELL INTO FRAME 1
(c) ⑧ : WRITING IS IMPOSSIBLE

ATM CELL PROCESSING APPARATUS

CROSS-REFERENCE TO RELATED APPLICATION

This application relates to U.S. Ser. No. 09/044,171 entitled "ATM system", filed on Mar. 19, 1998 by applicants and assigned to the present assignee based on Japanese Patent Application No. 9-065908 filed on Mar. 19, 1997. The disclosure of that application is incorporated herein by reference.

BACKGROUND OF THE INVENTION

The present invention relates to a communication apparatus of asynchronous transfer mode (hereafter referred to as ATM) suitable for broad-band communication, and in particular to a CLAD (Cell Assembly and Disassembly) apparatus for generating a frame from fixed length packets (cells) and generating fixed length packets from a frame.

The ATM (Asynchronous Transfer Mode) is a technique capable of sending all of various kinds of information such as speech, video image, and data via the same network. In the ATM system, a communicated data is converted from various forms (e.g. streaming data or various length frames) to fixed-length packets (ATM cells) and the cell is managed as a unit.

For partitioning information frames of various forms to ATM cells, and reconstructing frames from ATM cells, the CLAD (Cell Assembly and Disassembly) function described in "Standard ATM Text" published by ASCII company on March 1995, p. 109 is required. As described in "Standard ATM Text," p. 63, the CLAD has a function of mounting frames or packet data of a higher layer onto cells and reconstructing frames or packets from incoming cells. An example of the CLAD is disclosed in JP-A-7-183887 filed for a Japanese patent application by the present assignee.

The cell disassembly and frame producing function included in the CLAD function is a function of assembling a frame from one or more cells. It becomes necessary to buffer cells in a memory until frame production is completed and the frame is sent to a processor which manages the function of higher layer. This cell buffer memory typically is composed of SRAMs (Static Random Access Memory).

In recent years, enhanced functions are required to the CLAD function. For example, as the Internet spreads, the traffic incorporating IP (Internet Protocol) in the ATM system increases. In the routing of the IP, analysis of data in the IP layer is required. In an ATM system which has IP routing function (IP router) therefore, it is necessary to disassemble an ATM cell once to obtain IP frames, conduct routing decision processing, and then assemble the ATM cells in cases of LAN emulation, IP switching, and the like. In some cases, such an IP router is disposed in a backbone network transmitting data at high bit rate. The cell disassembly and frame assembly apparatus of the CLAD apparatus classifies cells which have arrived for each VC connection, assembles frames, and sends the assembled frames to a processor which manages the function of higher layer. Since frames multiplexed on the transmission channel are sent mixedly in time as ATM cells, the CLAD is required to assemble a plurality of frames at the same time. Since a large number of ATM communication channels are accommodated in a fast ATM switching apparatus, the CLAD function is required to assemble an increased number of frames at the same time. Therefore, it should be considered how to implement a big buffer memory in capacity.

As for implementation of the buffer memory, a method of connecting an external RAM to an LSI including a control circuit and a method of disposing a SRAM within an LSI are typical. If it is attempted to form an ATM CLAD apparatus having a large capacity as in the former method, the access speed to the RAMs and the number of input and output pins of the LSI and the RAM restrict the capacity and speed of CLAD. Furthermore, in the latter case where the LSI incorporates a memory, the area on which the RAM can be mounted is limited and consequently it is difficult to implement a cell buffer with large capacity by using a SRAM. For solving this problem, it is conceivable to embed DRAMs (Dynamic Random Access Memory) having a simple memory structure and a small mounting area as the RAM forming a cell buffer with large capacity instead of the SRAMs.

As described in "VLSI memory" published by Baifukan in November 1994, pp. 101–110, a DRAM is formed by a plurality of banks each having a plurality of memory devices arranged in a matrix form in the column direction and in the row direction. With an address selected by using three parameters, i.e., the column, row, and bank, data writing and reading are executed. Such an access mode that the column is changed with the same bank and row is referred to as column access. Such an access mode that the bank is changed irrespective of the column and row is referred to as bank access. Furthermore, such an access mode that the row is changed with the same bank irrespective of the column is referred to as row access. The DRAM is a memory having such a property (referred to as anisotropy) that a change occurs in the access time and data output time according to each access mode.

To be concrete, in view of access time, fast access is possible in the column access and the bank access. However, the row access requires an access time which is several times as long as that of the column access and the bank access. Furthermore, in the case of the column access, fast data outputting is possible. In the case of the bank access and row access, it takes a time several times as long as that of the column access to output data. Furthermore, in all access modes, the data read time in the read access is longer than the data write time in the write access.

In other words, the DRAM is such a memory that the fastest consecutive access becomes possible when performing the data writing and reading operation by using the consecutive column access, such as the consecutive address read operation and write operation, and fast operation is conducted in this operation mode. In some information processors such as computer systems, a large amount of data, such as picture data and file data of the computer system, are written into a memory in a burst manner (consecutive address write), stored until they are needed, and read out from the memory in a burst manner when needed (consecutive address read). The DRAM is a memory suitable for fast execution of such burst data input and output and storage of data. On the other hand, in such a utilization method that the three access modes occur at random, i.e., addressing in conducting the data read operation and data write operation occurs at random, the latency (access time delay and data output delay) differs because of the anisotropy described above and consequently high throughput cannot be expected. Furthermore, since data disappear when a time has elapsed because of an electric property specific to the structure of the DRAM, it is also necessary to execute data refreshing for providing dedicated timing in order to prevent this.

On the other hand, the CLAD function, categorizes and accommodates the cells which are input from the transmission path periodically, in accordance with the VCI/VPI value. Therefore, the CLAD accesses to the cell buffer at random.

In other words, in the CLAD apparatus, cell inputting and outputting with random addresses are executed nearly continuously in order to assemble a plurality of cells input from each of a plurality of connections. In addition, the random state of the input and output timing and address of the cells input to the CLAD apparatus varies in accordance with the random traffic state of the communication network. Even if it is attempted to define predetermined rules beforehand and exercise control in the CLAD apparatus, such random state varies in accordance with the state of the communication network using a switch.

After the frame assembling finishes, the frame has to be read out. One possible implementation is that higher layer management is performed by MPU (Microprocessor Unit). In such implementation the read timing of MPU is at random. It means that the access wait causes if the MPU tries to read the frame while the CLAD is writing the cell to the buffer. This results in a problem of lowered throughput.

If a DRAM is used in the cell buffer of the CLAD apparatus having the above described properties, the three access modes described above occur at random. Therefore, the anisotropy becomes a bottleneck. If the frame production is not conducted at timing with due regard to the longest access time and the longest data input/output delay of the DRAM, cell loss occurs. If the switching rate is lowered in order to avoid this cell loss, the throughput is lowered. Furthermore, if the data refreshing operation is conducted at appropriate intervals in such a state that the cell inputting and outputting are being executed substantially continuously, the throughput is further limited.

Specifically, the switching rate with due regard to the longest access time and the longest data input and output delay time of the current DRAM is approximately one ten-and-several-th that of the SRAM. Therefore, it is difficult to simply use a DRAM in the CLAD apparatus of the ATM system required to have high throughput.

As one of the ATM switching systems, a shared buffer type switch is known. In this case, ATM cells sent from a plurality of input ports to the switching system in parallel are converted to a time series of ATM cells by a multiplexer, and thereafter temporarily stored in a shared buffer memory. The ATM cells read out from the buffer memory are selectively distributed to one of a plurality of output ports associated with header information (VP/VCI) of each cell, via a demultiplexer.

U.S. Pat. No. 5,099,475 discloses a shared memory type ATM switching system. In this ATM switching system, a buffer memory is formed by eight buffer memory LSIs associated with respective bits of 8 bit parallel format byte of an ATM cell. Each byte of ATM cell data is subjected to bit slice and written into these memory LSIs in parallel.

Furthermore, a literature "32×32 Shared Buffer Type ATM system VLSI for B-ISDN," IEEE International Conference on Communications, Jun. 23–26, 1991 discloses configuring the above described bit sliced buffer memory LSIs by using synchronous-clocked static RAMs.

SUMMARY OF THE INVENTION

An object of the present invention is to provide a CLAD apparatus and corresponding method where the CLAD apparatus has a large capacity and high throughput and causing minimal cell loss, and provide an ATM system using such a CLAD apparatus. More specifically, an object of the present invention is to provide a CLAD apparatus and corresponding method where the CLAD apparatus has a highly integrated large-capacity DRAM embedded therein and provide an ATM system using such a CLAD apparatus.

Another object of the present invention is to provide means for absorbing dispersion of access time and delay time caused by the random access of the DRAM, and a further object of the invention is provide a CLAD apparatus including a DRAM having this means, having a large capacity and high throughput, and causing minimal cell loss, and provide an ATM system using such a CLAD apparatus.

More specifically, an object of the present invention is to provide a CLAD apparatus which includes means for absorbing dispersion of access time and data writing time caused by the random write access of the DRAM memory, and an ATM system using such a CLAD apparatus.

A further object of the present invention is to provide a CLAD apparatus which includes means for absorbing dispersion of access time and data reading time caused by the random read access of the DRAM memory, and an ATM system using such a CLAD apparatus.

A different object of the present invention is to provide a manner in which an MPU, which processes the higher layer management can read the assembled frames from the cell buffer without waits caused by collision of access timings and an ATM system using such a CLAD apparatus.

In accordance with an aspect of the present invention, the above described first object is achieved in the following manner. The cell buffer in the CLAD includes a plurality of DRAMs. Each incoming cell is divided into plural partial cells, of which the number is as many as or more than that of DRAMs. When each cell comes into the CLAD, the cell is divided into partial cells and the CLAD writes each partial cell into each DRAM in order. When the assembled frame is read from the cell buffer, the frame is read from respective DRAMs in order. In consequence, the access cycle for each DRAM becomes long enough for random accessing.

Furthermore, in order to implement DRAM accessing synchronized to the system clock, the cell writing and the frame reading are conducted alternately, and read timing and write timing to each DRAM is detached from each other at nearly fixed time intervals. From the point of view of cell processing, the random writing and reading of the cells can be attained. This procedure can be applied to not only the cell assembly unit of the CLAD apparatus but also a FIFO buffer in cell unit.

Furthermore, as means for achieving the above described different object, an agent circuit for accepting an access request of the MPU is provided. If the MPU issues an access request to the agent circuit in a frame production control unit, the agent circuit reads a frame from a frame producing buffer into a frame buffer (FIFO) included in the agent circuit at timing synchronized to the system clock. If a frame is prepared, the agent circuit informs the MPU of the fact. The MPU begins to read the frame.

Other objects, features and advantages of the present invention will become apparent from reading of the following description of the embodiments of the invention taken in conjunction with the accompanying drawing.

BRIEF DESCRIPTION OF THE DRAWING

FIG. 5 is a diagram showing the configuration of a management information buffer;

DESCRIPTION OF THE PREFERRED EMBODIMENTS

Figure 1:
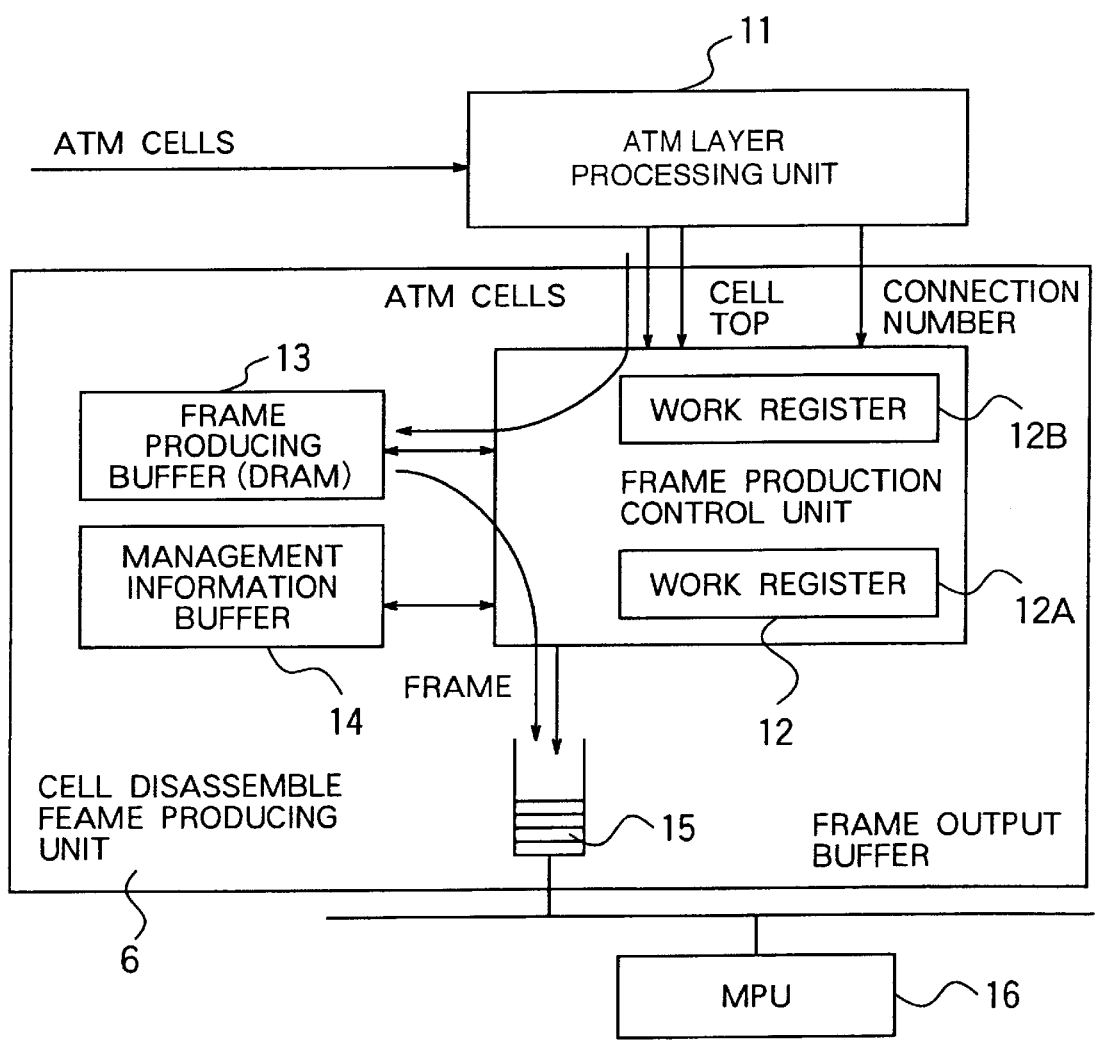
FIG. 1 is a block diagram showing an embodiment of the configuration of a CLAD apparatus including a frame producing buffer including a DRAM according to the present invention.

Hereafter, embodiments of the present invention will be described by referring to the drawings.

Figure 2:
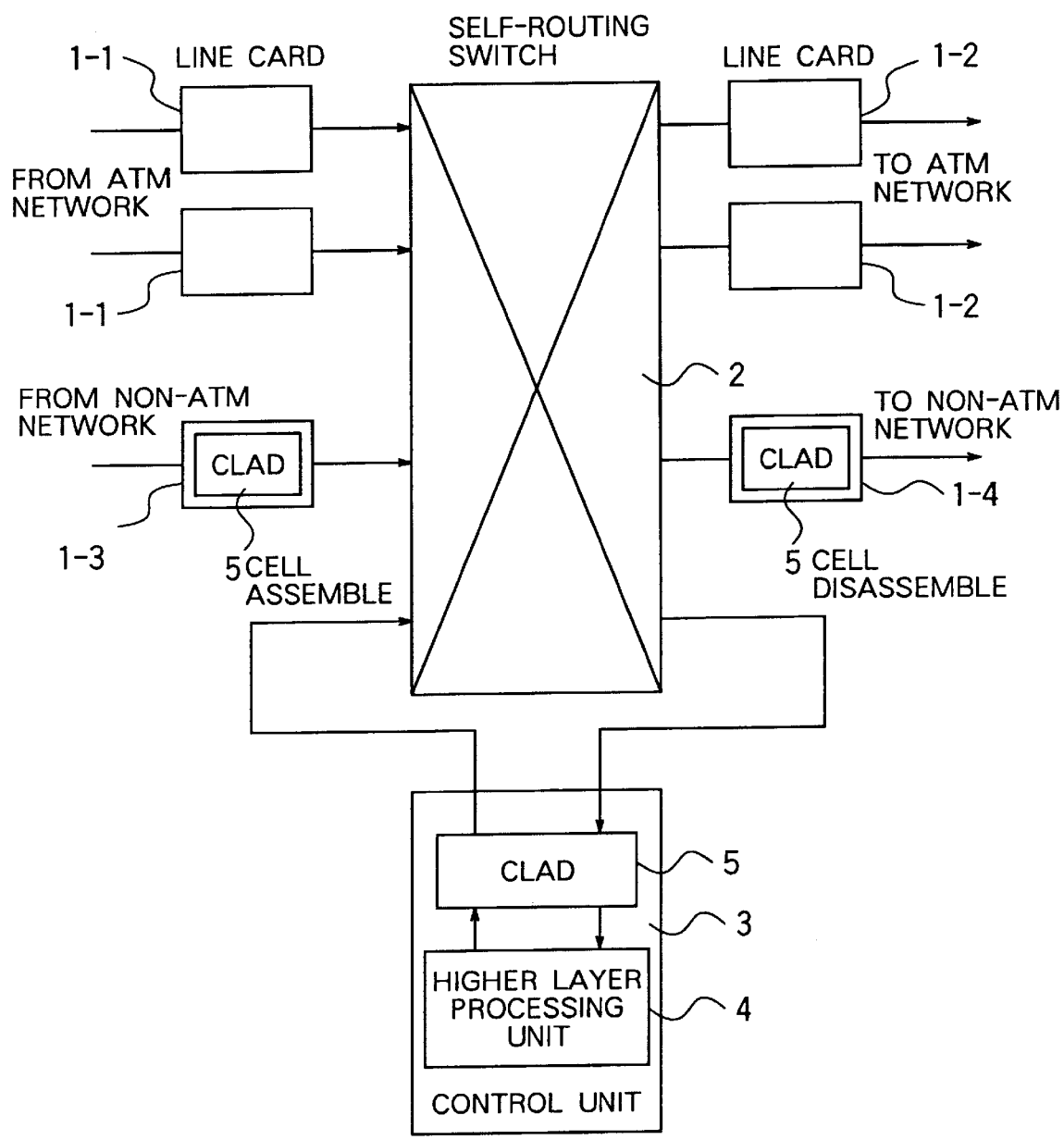
FIG. 2 is a block diagram showing an embodiment of an ATM communication apparatus incorporating a CLAD apparatus according to the present invention.

FIG. 2 shows an ATM communication apparatus of the present invention having a CLAD apparatus mounted thereon in the form of a block diagram. An ATM system of the present invention switches and outputs ATM cells and packets (converted to ATM cells by the CLAD apparatus) input from a plurality of input highways (exemplified by three input highways in the present embodiment) connected to an ATM network and a non-ATM network via line cards 1-1 and 1-3, to output highways via a self-routing switch 2 and output side line cards 1-2 and 1-4. The ATM system is formed with a cell multiplexer (not illustrated) for once multiplexing cells supplied from an input highway and a controller 3 for controlling the entire switch 1. In the present switch drawn in FIG. 2, the SRSW decides the output port of incoming cells according to a routing tag, which is assigned for each cell on the line cards (incoming side) and indicates the output port of the SRSW. Of course, the self-routing switch 2 may conduct the switching operation on the basis of virtual connection identifier/virtual pass identifier (VCI/VPI) originally included in the header of an ATM cell.

In FIG. 2, the input side line cards and the output side line cards are shown separately. However, they may be mounted on the same card. Input signals are switched by the self-routing switch 2 and routed to the output port of SRSW. In the case where signals other than ATM signals are accommodated in an ATM network, the function of mounting a frame on ATM cells and taking out a frame from ATM cells, i.e., the CLAD function is needed. In the communication apparatus of the present embodiment, CLAD apparatuses are mounted on the line cards 1-3 and 1-4 accommodating the transmission lines of the non-ATM networks. Furthermore, in the case where the processing of the higher layer of the ATM layer is conducted as in the IP routing, it is necessary to process the frame in the higher layer processor 4 mounted on the controller 3 once and resend the processed frame into the ATM network. In this case, cells are first sent from the self-routing switch 2 to the CLAD apparatus 5 mounted on the controller 3. The information represented in the ATM cell form is restored to a frame once. The frame is processed in the higher layer processor 4. Thereafter, the frame is mounted on ATM cells in the CLAD apparatus, and the cells are sent to the ATM network.

FIG. 1 shows an example of a cell disassemble frame producing unit of the CLAD apparatus 5 according to the present invention.

Here, the CLAD apparatuses used in the line card 1-4 and in the control unit 3 have the same configuration and the same function. In an ATM layer processing unit 11, data which have arrived in the form of cells are subjected to header extraction processing, and a connection number provided in association with the ATM connection and used within the apparatus is detected. In some cases, ATM cell header information is used as it is as this connection number. The cell itself and cell information such as the connection number are transferred to a frame production control unit 12 in synchronism with a cell top signal. This cell top signal is a signal sent from the ATM layer processing unit 11 to a cell disassemble frame producing unit 6 in synchronism with the head of the cell.

The frame production control unit 12 takes out frame production information of the pertinent connection from a management information buffer 14 according to the connection number, and determines in which address of a frame producing buffer 13 including a DRAM incoming cells should be stored. According to the determined address, incoming cells are stored in the frame producing buffer 13.

If all the cells carrying information of a certain frame arrive and production of the frame is completed, then the frame production control unit 12 reads out the completed frame from the frame producing buffer 13 and stores the frame in a frame output buffer 15.

In the present embodiment, a MPU (Micro Processing Unit) 16 is used as a component for conducting the processing of the higher layer. The MPU 16 effects control so as to read the completed frame from the frame producing buffer 13 and store the frame thus read out in the frame output buffer 15. If the completed frame has arrived at the frame output buffer 15, then a frame is read out therefrom and the frame is processed. In the frame processing, processing of the protocol of a layer higher than the ATM layer and processing of delivering a payload portion to application software are included.

Figure 3:
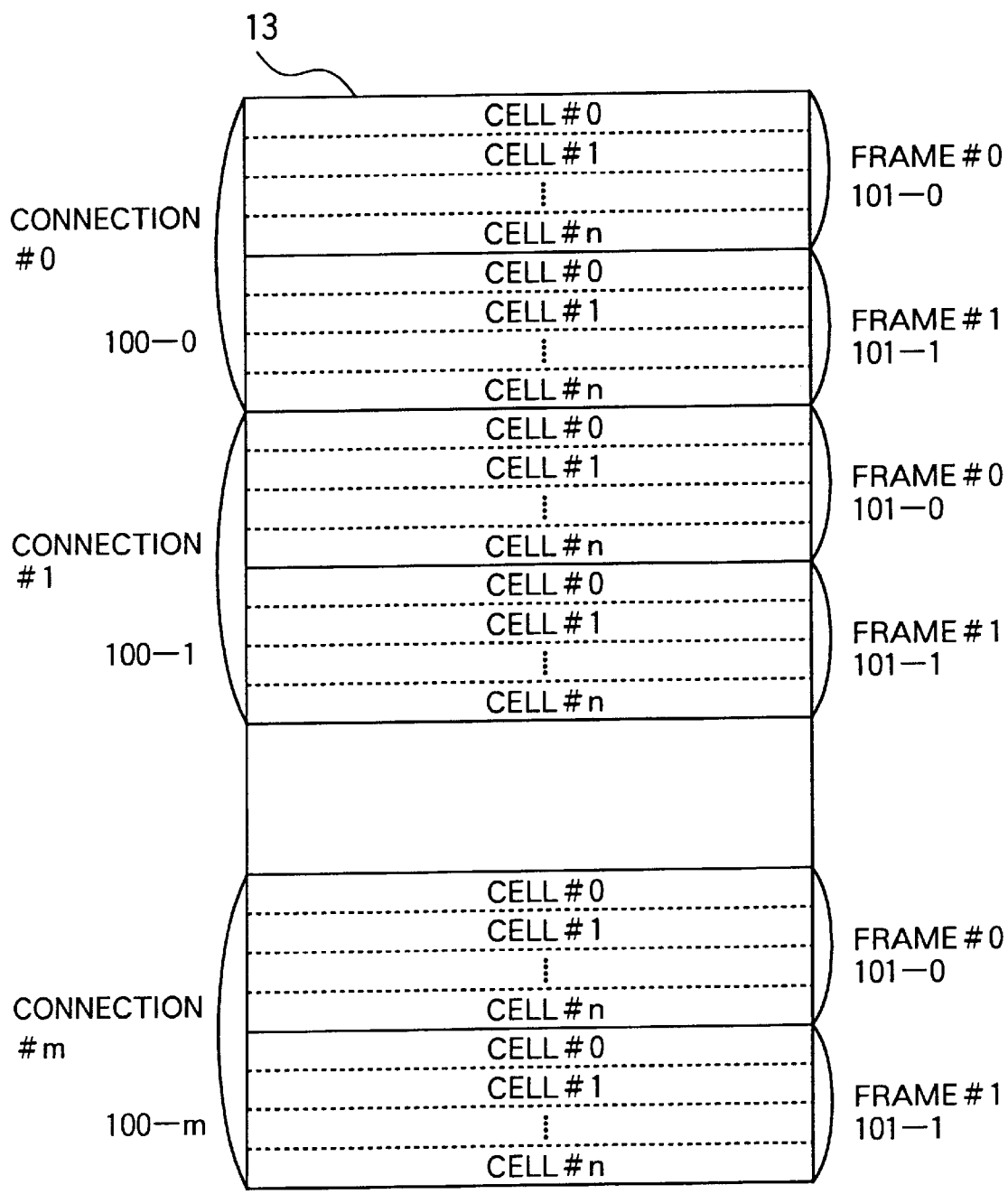
FIG. 3 is a diagram showing the configuration of the frame producing buffer.

FIG. 3 shows an example of the configuration of the frame producing buffer 13.

The buffer 13 is managed for each of connections (100-0 to 100-m). In a buffer area of this frame producing buffer 13, a plurality of frame storage areas (for example, such as 101-0 and 101-1) are secured for each connection. In FIG. 3, it is exemplified that two frames can be stored per connection.

Furthermore, since a frame is formed by a plurality of cells, each frame area is managed by taking a cell as a unit.

In the present embodiment, a cell storage area for producing a frame is secured so as to match the maximum length of a frame. For example, in the case of IP (Internet Protocol), the maximum frame length is approximately 1500 bytes. In this case, one frame can be formed by a maximum of approximately 31 cells.

If it is now assumed that the CLAD apparatus accommodates 4000 connections and has a frame storage area corresponding to two frames for each connection, there is needed the frame producing buffer 13 having the following storage capacity.

1500 bytes×2 frames×4000 connections =12 Mbytes

If the number of connections is larger, a storage capacity larger than that is needed.

Figure 4:
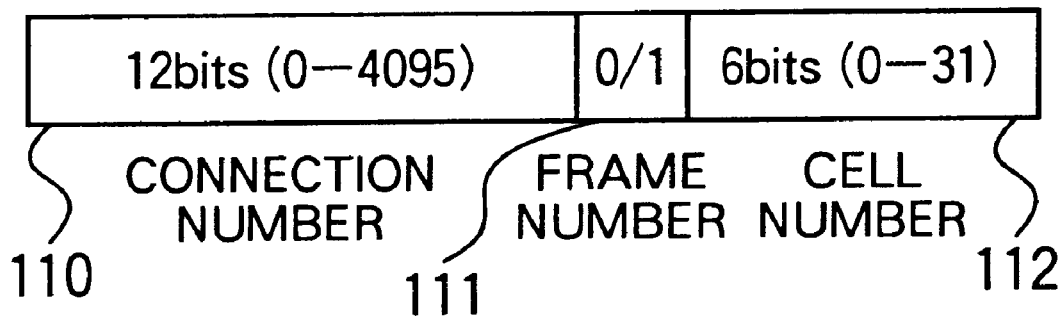
FIG. 4 is a diagram showing the configuration of an address of the frame producing buffer.

FIG. 4 shows an example of address configuration (110, 111, 112) of the frame producing buffer 13. The address is generated by taking a cell as a unit. In the present embodiment, there is shown the case where the number of connections is 4096 (12 bits), the number of frames per connection is 2 (1 bit), and the maximum number of cells per frame is 31 (6 bits). Thereby, a cell included in the frame producing buffer 13 can be uniquely specified.

FIG. 5 shows an example of configuration of a management information contained in the management information buffer 14. The management information contains the buffer management information of the frame producing buffer 13. The management information including a read flag, a write flag and a write cell number for each frame buffer area 101. Combination of a read flag and a write flag indicates the state of the frame producing buffer 13.

The write flag (121, 123) indicates that the frame is being produced using the buffer area 101. The read flag indicates that the frame is being read (including the read wait).

The write cell number (124, 125) indicates the cell storage area number where a cell corresponding to the frame are subsequently stored.

In the present embodiment, the management information buffer 14 holds such information concerning frame 0 and frame 1.

Figure 6:
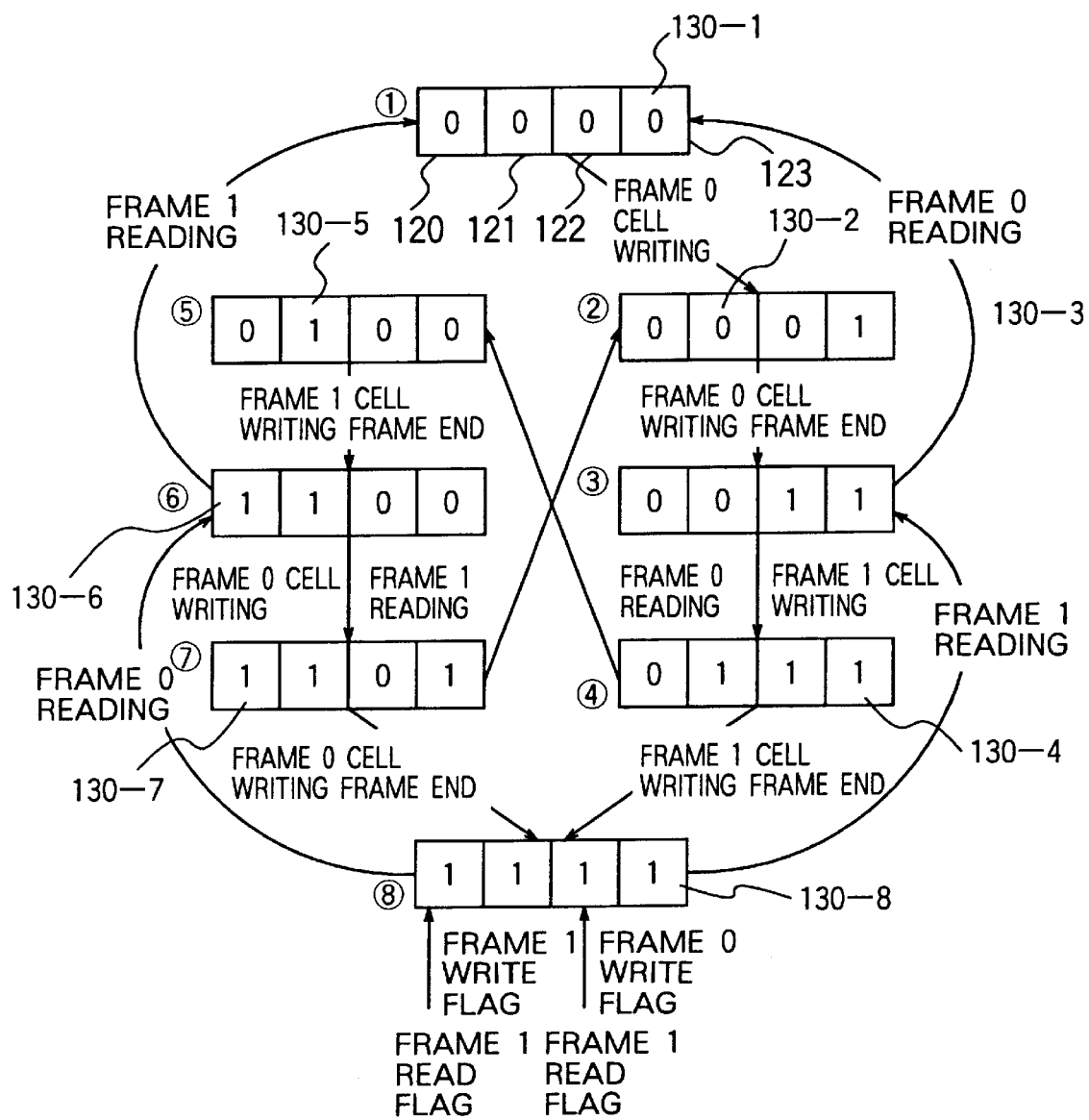
FIG. 6 is a diagram showing the state transition of a state flag of the management information buffer.

FIG. 6 shows the state transition (only the normal processing sequence) of state flag (120, 121, 122, 123) preserved in the management information buffer. First of all, we explain the state transition of the flag while one frame (i.e. one or more cells) arrives. If a cell arrives in the initial state (with the read flag 0 and the write flag 0, hereafter represented as "00" in order), then the cell is written into an area of the frame producing buffer 13 specified by the write cell number, thereafter the write cell number is incremented, and the write flag is set to 1 (resulting in state "01"). If subsequently a cell concerning the frame arrives, then similar processing is conducted. If the last cell of the frame arrives, the read flag is set to 1 (resulting in state "11"). If reading of the frame is completed, the write flag, the read flag, and the write cell number are cleared, i.e., set to 0 (resulting in state "00"). By repeating this processing, frames are produced.

So as to be capable of receiving the next frame even in the frame read wait, a plurality of frame storage areas are held for each connection. For one connection, therefore, it is necessary to manage at least two frame buffers. This state transition is shown in FIG. 6. When one of the frame buffers is in the read wait state, writing is conducted into the other of the frame buffers. FIG. 6 shows the state transition diagram at this time.

When a frame subsequently arrives in state ① (130-1), state ② (130-2), ⑥ (130-6) or ⑦ (130-7) shown in FIG. 6, the cells are written into the frame 0 side. In states ③ (130-3), ④ (130-4) and ⑤ (130-5), the cells are written into the frame 1 side. In state ⑧ (130-8), both buffers are in the read wait state, and consequently there is no area for storing cells and cells are discarded.

Figure 7:
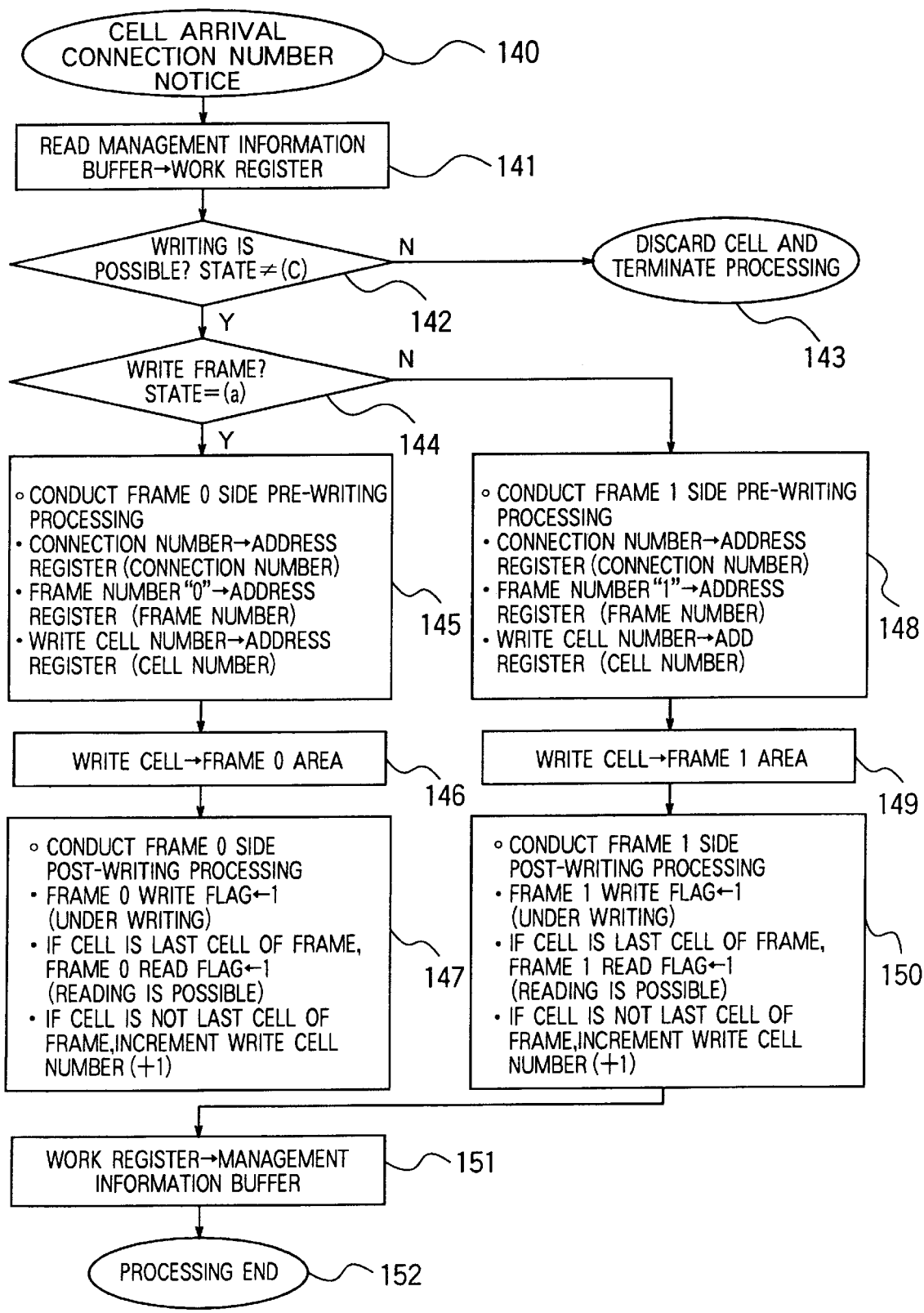
FIG. 7 is a diagram showing a flow chart which shows the operation of a frame production control unit at the time of cell arrival.

FIG. 7 is a flow chart showing the operation of the frame production control unit 12 conducted when a cell has arrived. If a cell arrives from the ATM layer processing unit 11 together with the connection number (step 140), information concerning the pertinent connection is read out from the management information buffer 14 and put into a work register 12A within the frame production control unit 12 (step 141). The cell writing process is conducted on the basis of a value of the present work register. Finally, changed information is moved from the present register into the management information buffer 14 (step 151).

First of all, it is checked whether there is a room to write the incoming cell into the frame producing buffer. (Only in the state (c) of FIG. 6, there is no room. Therefore, cell writing is impossible.) If writing is possible, then it is determined which of the frame storage areas the cell should be written in. In the case of the state (a), processing of writing the cell into the frame 0 side is conducted. In the case of the state (b), processing of writing the cell into the frame 1 side is conducted.

To be concrete, as for the cell writing processing, the connection number, frame number and write cell number are first loaded into a write address register steps 145 and 148). The cell is stored in a predetermined location in the frame producing buffer (steps 146 and 149). Thereafter, the frame write flag is set to 1 (under writing). Furthermore, in the case where the pertinent cell is the last cell of the frame, the read flag is set to 1. If the pertinent cell is not the last cell of the frame, the write cell number is incremented (steps 147 and 150).

Finally, the value of the work register 12A is moved into the management information buffer 14 (step 151), and the arrival processing of one cell is finished (step 152).

Figure 8:
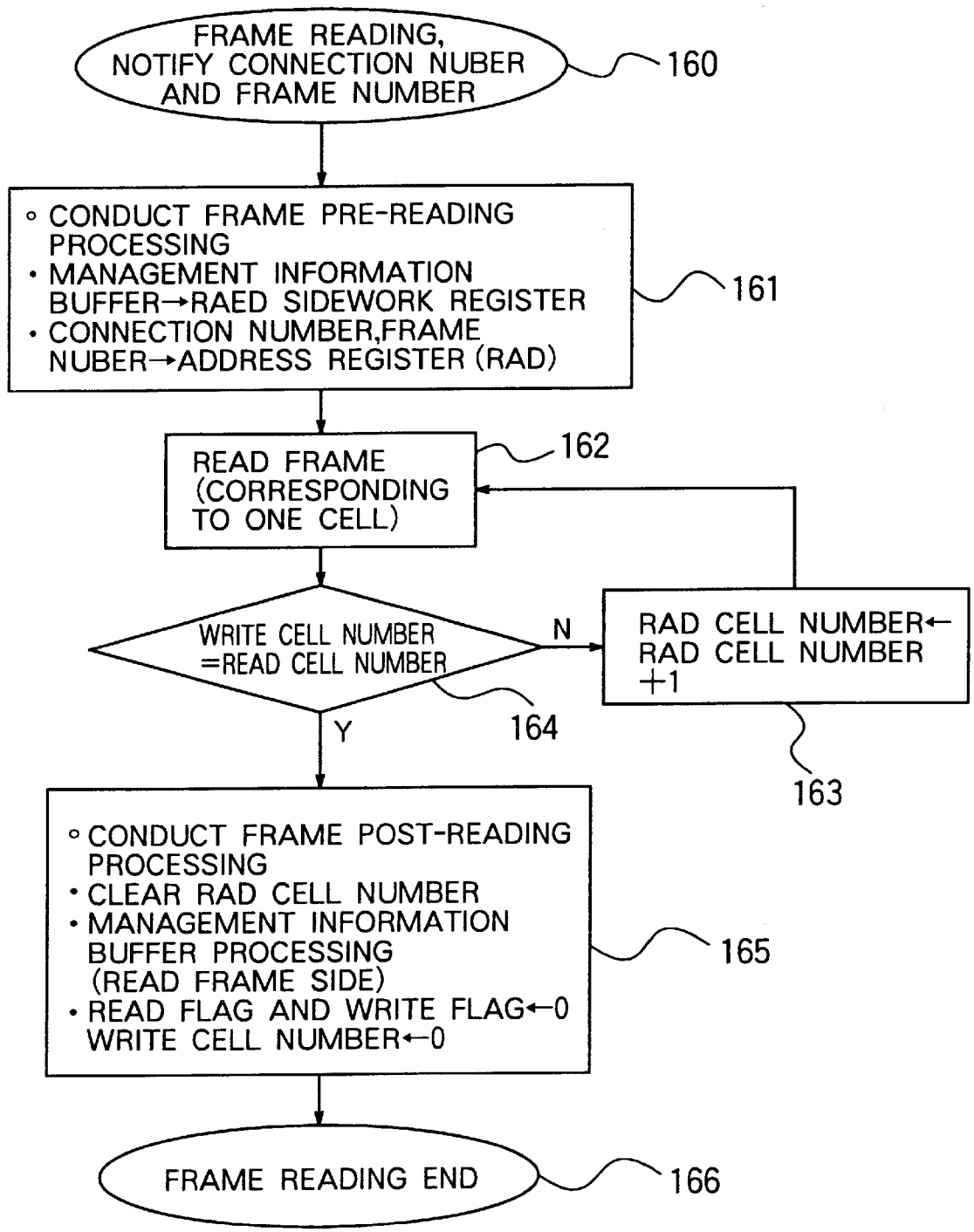
FIG. 8 is a diagram showing the sequence of frame readout.

FIG. 8 shows the sequence of frame reading. A frame reading control unit (not illustrated) of the frame producing control unit 12 has a read side work register 12B for temporarily storing the value of the management information buffer. The read control unit is notified of the connection number and frame number by the management information buffer 14 at the time of start of frame reading (step 160). The value of the management information buffer 14 is stored in the read side work register 12B. The connection number and frame number are written into a read side address register (RAD) (step 161). When reading a head cell of a frame, the cell number is 0. Subsequently, in accordance with the address of the frame producing buffer shown in FIG. 4, information corresponding to one cell is read out (step 162). If the write cell number coincides with the read cell number (cell number in the RAD) after reading (step 164), the pertinent cell indicates the last cell of the frame and consequently the RAD cell number is cleared to 0 (step 165). In the case of noncoincidence, the RAD cell number is increased by one (step 163) and frame reading is continued.

By the above described processing, the cell assembly processing is conducted.

Hereafter, cell writing into/reading from the frame producing buffer 13 formed by a DRAM in the cell disassemble frame producing unit according to the present invention will be described by referring to FIGS. 9, 10 and 11.

Figure 9:
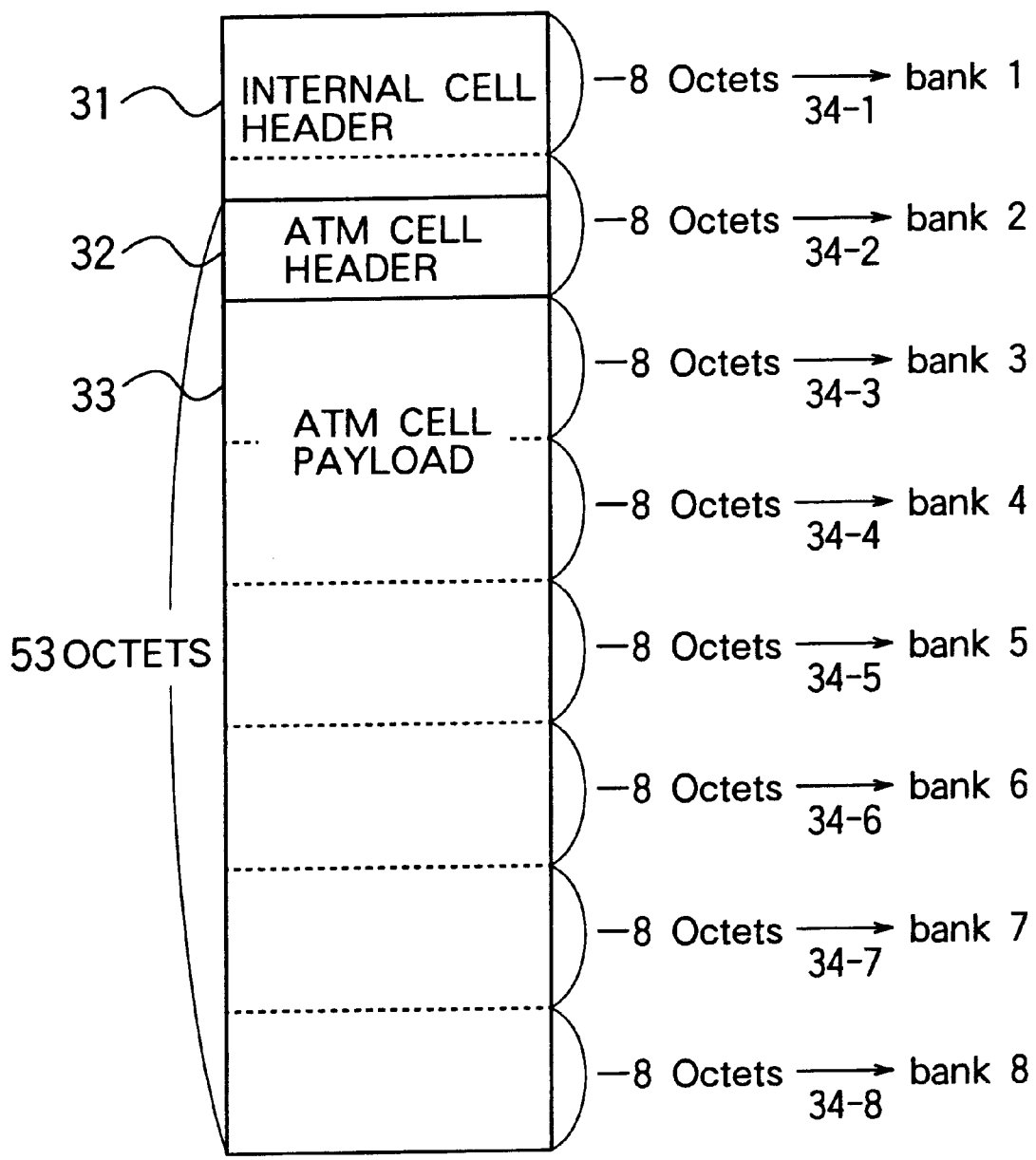
FIG. 9 is a diagram showing a method for storing cells into a frame producing buffer including a DRAM according to the present invention.

As shown in FIG. 9, each of ATM cells is of 53 octets, which contains an ATM cell header 32 and an ATM cell payload. Furthermore, an internal cell header 31 may be added in order to conduct processing within the ATM switching apparatus.

In the present embodiment, each of cells within the ATM switching apparatus is provided with 64 octets.

In the present embodiment, each ATM cell is processed in an 8 octet (64 bit) parallel form. Information transfer of 64 bits (a partial cell) is conducted every clock timing. In this case, one ATM cell is transferred by 8 clock pulses. The cell parts transferred by the 8 clock pulses are successively written into eight separate banks, i.e., DRAM banks 1 through 8. Also when reading a frame, consecutive frame information pieces are stored beforehand in separate banks in order and consequently information pieces are taken out from the DRAM banks in order.

Figure 10:
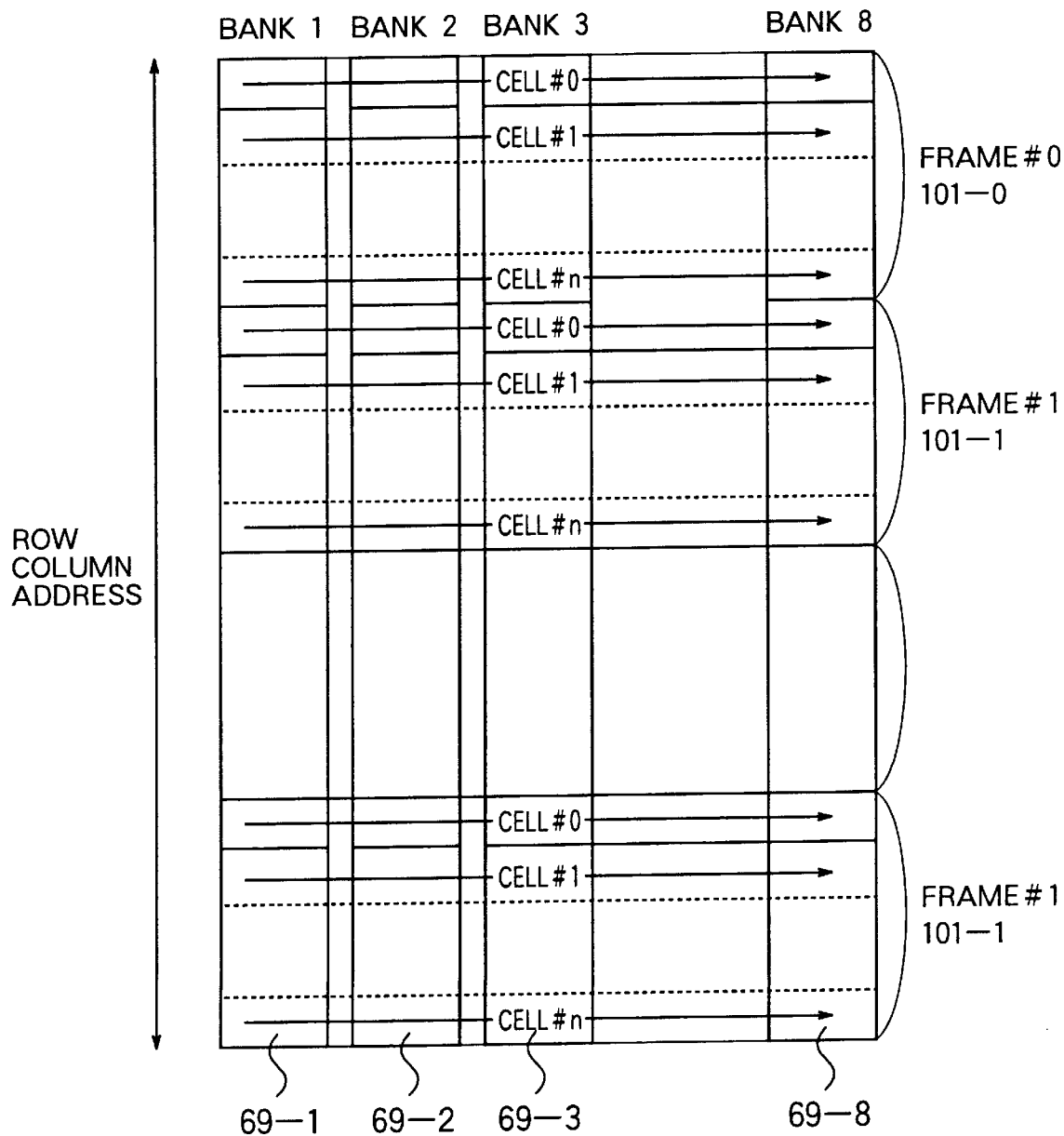
FIG. 10 is a diagram illustrating a method for arranging a DRAM array of a frame producing buffer according to the present invention and a method for storing cells and frames.

FIG. 10 is a configuration diagram of a DRAM (frame producing buffer) 13 for accommodating ATM cells and producing frames.

If an ATM cell included in a certain frame to be formed arrives, that ATM cell is written into an area which is included in a place where information of that frame should be written and which is located next to an area where a cell in the same frame which had arrived immediately before was stored. The cell parts are written into bank 1 (69-1), bank 2 (69-2), . . . in order from the head. If all unit cells forming a certain frame arrived and the frame is to be read, parts of the frame are read in order from the head of the area in which the frame was stored. If all ATM cells required to form a certain frame have been input, the frame production control unit 12 sends a frame input completion notice to the MPU 16 to notify it of the fact. The frame production controller 12 can determine whether all ATM cells of a certain frame have arrived by checking data included in a PT field (AAL5: ATM Adaptation Layer 5) which is included in an ATM cell sent from the ATM layer processing unit 11.

As for writing to/reading from the banks of the frame producing buffer 13, frame information is also read in the order of the bank 1 (69-1), bank 2 (69-2), . . . because parts of each cell are written into banks in the order of the bank 1 (69-1), bank 2 (69-2), . . . It is a matter of course that similar effects can be obtained even if parts of each cell are written into banks in the order of the bank 8 (69-8), bank 7 (69-7), . . . However, it is necessary that the order of reading the data from banks also corresponds to the order of writing data. In the present embodiment, both the number of banks and the number of divisions of each ATM cell provided by the frame production controller are eight. However, a number equivalent to the n-th power of 2, such as 4, 8, or 16, may be adopted. Furthermore, the number of banks need not always be equal to the number of divisions of each ATM cell to be assigned to the banks. Such various combinations as to be capable of absorbing the anisotropy of the DRAM, allowing bank access to the DRAM, and preventing cell discard are also possible.

Figure 11:
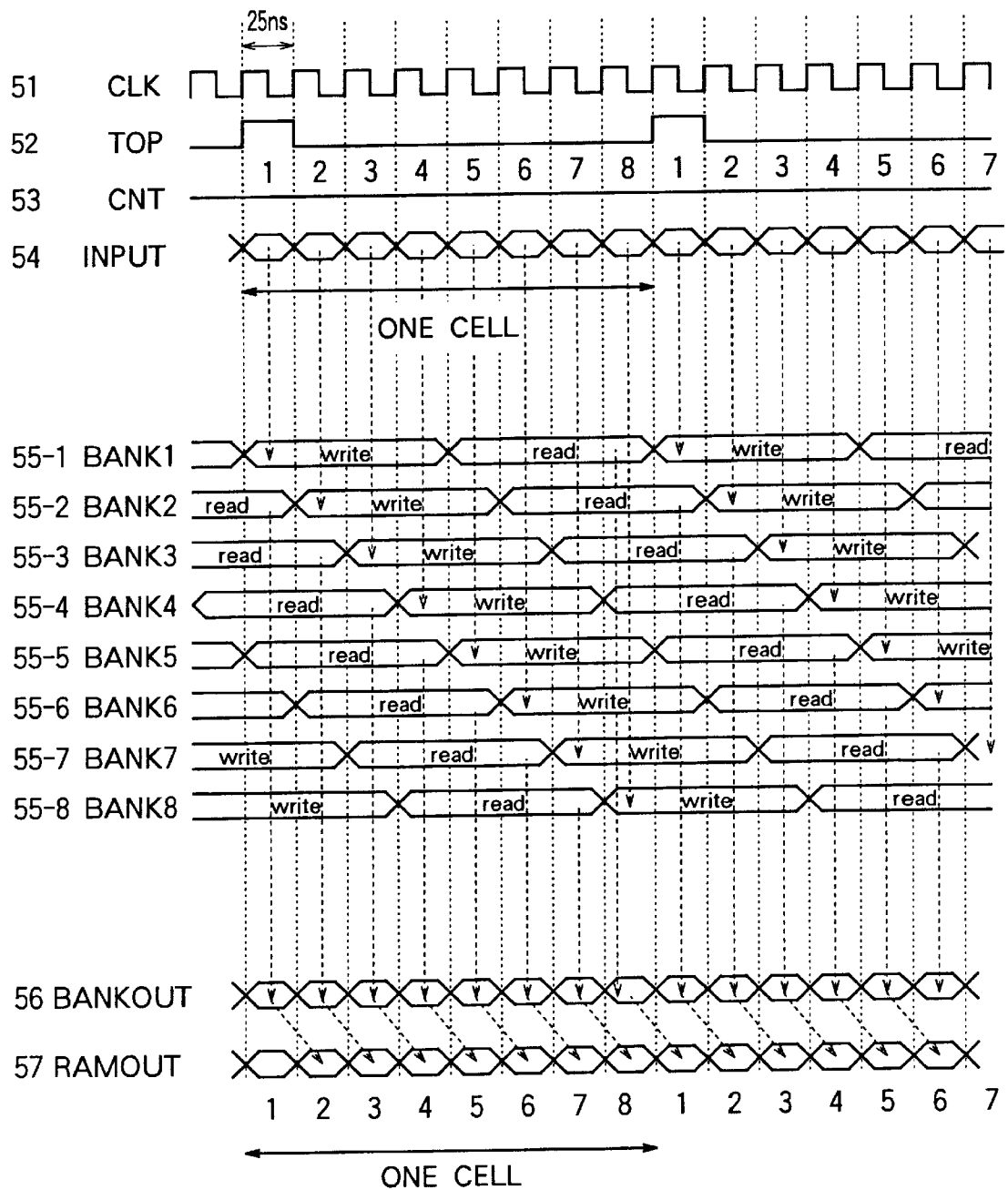
FIG. 11 is a timing chart illustrating timing of cell writing and frame reading of a DRAM array which forms a frame producing buffer including a DRAM according to the present invention.

FIG. 11 is a timing chart showing timing of cell reading and cell writing. CLK 51 denotes a clock for transferring cells. In the present embodiment, the clock CLK 51 has a frequency of, for example, 40 MHz. In the present embodiment, each cell is transferred in a 64 bit parallel form. Therefore, one cell is transferred in 8 clock timing (INPUT 54).

A cell top signal (TOP) 52 is transferred in synchronism with the cell heads. A timing counter (CNT) 53 counts up in synchronism with the CLK 51. The counter manages the cell arrival timing. In the present embodiment, the counter is reset to 1 when the cell top signal has arrived.

If the storage location of cell which has arrived is determined, parts of the cell are written into banks in order.

When the CNT 53 is 1, a cell part is written into a bank 1 (55-1). When the CNT 53 is 2, another cell part is written into a bank 2 (55-2).

Also when reading a frame, the frame outputting is conducted in synchronism with the input side cell top signal. In this case, with due regard to the latency taken from the time when a read address is given until data is output, which is a feature of random access of DRAM, a read address is input for the bank 1 when the CNT is 5. Thereupon, a data is output from the bank 1 at timing of the CNT becoming 8. By in the same way accessing the bank 2 when the CNT is 6, accessing the bank 3 when the CNT is 7, and so on, data are output respectively when the CNT is 1, 2, and so on. By latching this signal in one stage and outputting it, therefore, information of the frame corresponding to one cell can be taken out in synchronism with the cell top.

In the present embodiment, the latency of the bank access of the DRAM is set to 3 clock timing intervals. This depends upon the characteristics of the DRAM in use, and this may be later or earlier. In that case, the timing may be changed according to the latency.

Assuming that the write access/read access for one DRAM bank is one cycle and the number of banks is n, therefore, the access cycle becomes n/2 times the cell arrival clock period. Even if the access rate of one DRAM is slow, therefore, the access rate for the frame producing buffer can be raised by forming the DRAM array.

Figure 12:
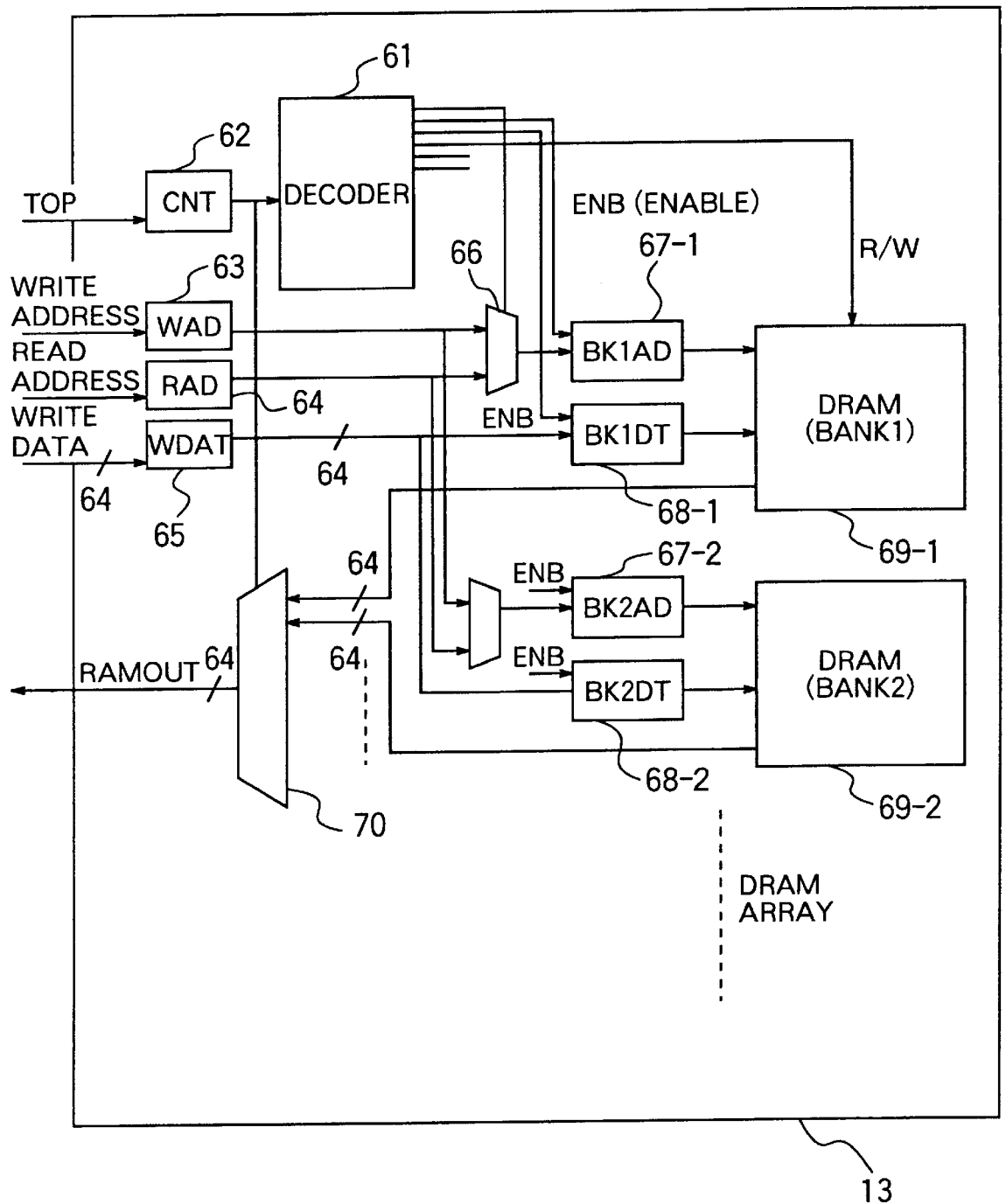
FIG. 12 is a block diagram showing an example of the configuration of a DRAM peripheral circuit of a frame producing buffer including a DRAM, according to the present invention.

By referring to FIG. 12, an example of configuration of the frame producing buffer including a DRAM will now be described.

As described above with reference to FIG. 11, the CNT counts up according to the cell transfer clock. In synchronism with the cell top signal, the cell write address determined by the frame production control unit 12 is transferred to a write address register WAD 63 and a frame read address is transferred to a read address register RAD 64. The value of a CNT 62 is coupled to a decoder of the counter value. Each DRAM bank has a DRAM access address holding register (such as BK1AD 67-1, BK2AD 67-2, . . . ) and a write data holding register (such as BK1DT 68-1, BK2DT 68-2, . . . ). A decoder 61 generates data load timing signals for registers and read write access timing signals for the DRAM. As a result, access to the DRAM array according to the time chart shown in FIG. 11 becomes possible.

Figure 13:
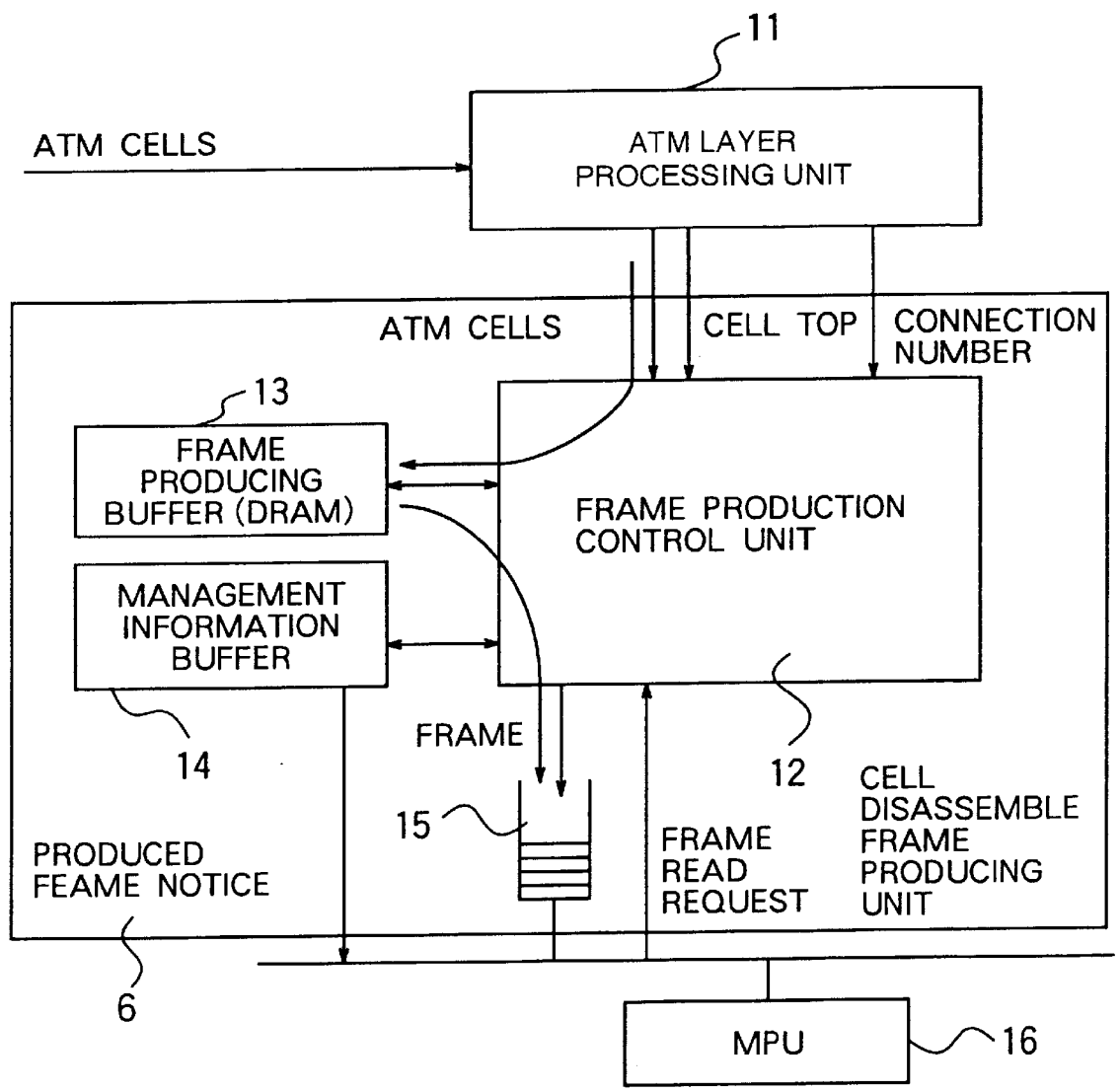
FIG. 13 is a block diagram showing an example of the configuration of a CLAD apparatus capable of taking out a desired frame in response to a request from a MPU, according to the present invention.

FIG. 13 shows a different embodiment of the cell disassemble frame producing unit of the CLAD according to the present invention.

If a frame is produced in the configuration of FIG. 1, the frame production control unit 12 reads out the frame into the frame output buffer 15 without the intervention of the MPU 16. In FIG. 13, the produced frame information stored in the management information buffer 14 can be accessed from the MPU 16. Upon detecting a produced frame, the MPU 16 requests the frame production control unit 12 to read the frame. In response to the read request, the frame production control unit 12 reads the frame from the frame producing buffer 13. As a result, the MPU 16 can select and take out a desired frame. In the above embodiments, a plurality of DRAMs or DRAM array may be applicable for the DRAM banks, respectively.

Figure 14:
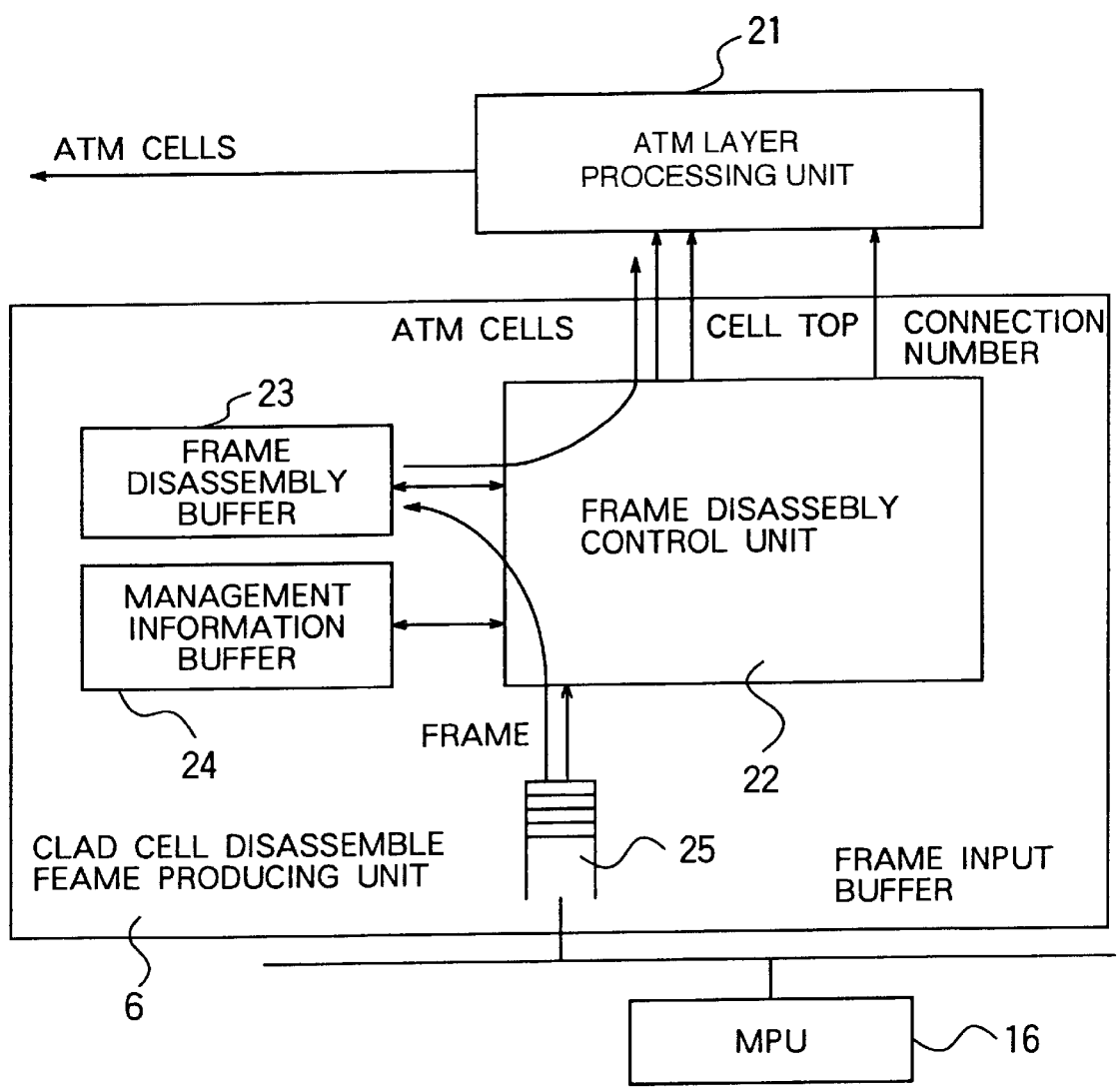
FIG. 14 is a block diagram showing a different embodiment of a CLAD apparatus including a frame disassembly buffer including a DRAM according to the present invention.

In the foregoing the configuration of the side of producing a frame from ATM cells has been described. The description can also be applied to the side of disassembling a frame into ATM cells in a similar manner. FIG. 14 shows the block configuration of the frame disassembly side. Upon producing a frame, the MPU 16 writes the produced frame into a frame input buffer 25. Based on the management information from a management information buffer 24 a frame disassembly control unit 22 writes the frame into a frame disassembly buffer 23 by taking the payload of an ATM cell as a unit. This frame disassembly buffer 23 is formed by a DRAM of bank configuration which may alternatively be DRAMs of array configuration. Areas of the DRAM banks are assigned so that specific bytes of the payload of each ATM cell may be successively written into specific banks. When reading ATM cells, the frame disassemble control unit reads the bytes from the banks successively. As a result, it becomes possible to avoid consecutive writing into the same bank and consecutive reading from the same bank. Thus fast memory access becomes possible.

According to the present invention, each of the frame producing buffer and the frame disassembling buffer is formed by including a DRAM. Thereby, the capacity of the frame producing buffer or frame disassembling buffer increases and the number of simultaneously produced frames increases. As a result, a highly reliable CLAD can be formed. A CLAD for a fast transmission line accommodating a large number of VCs can be formed.

Furthermore, according to the present invention, a DRAM buffer allowing random access and read by taking a cell as a unit can be formed. A FIFO buffer having a large capacity, low price, and taking a cell as a unit can be formed. The present invention can also be applied to a switch having a relatively small capacity.

What is claimed is:

1. An ATM cell processing apparatus comprising:
   a first memory formed of a plurality of banks for temporarily storing ATM cells, forming a frame received from a plurality of input lines;
   a second memory for storing frame management information to manage a state of said frame stored in said first memory for each connection; and
   a control unit, wherein said control unit comprises:
      a control mechanism for dividing an ATM cell into a plurality of partial cell data according to a division number based on excess capacity of said plurality of banks of said first memory, successively writing said partial cell data into respective banks of said first memory according to said frame management information stored in said second memory, and in response to arrival of said ATM cells forming one frame, successively reading parts of said frame from respective banks of said first memory to produce said frame.

2. An ATM cell processing apparatus according to claim 1, wherein said first memory is assigned for respective connections, and is divided into a plurality of areas for storing frames of respective connection, and each of said areas for storing a frame is divided into a plurality of cell storing areas.

3. An ATM cell processing apparatus according to claim 1, wherein said first memory includes a plurality of DRAMs for said banks.

4. An ATM cell processing apparatus according to claim 3, wherein each of said DRAMs is embedded physically in the same chip as said control unit.

5. An ATM cell processing apparatus according to claim 1, wherein said first memory has as many banks as said division number of said partial cell data.

6. An ATM cell processing apparatus according to claim 5, wherein the number of said banks of said first memory is one of a group of 4, 8 and 16.

7. An ATM cell processing apparatus according to claim 1, wherein said second memory comprises:
   a state number area for indicating the state of said frame using a write flag indicating that said frame is being produced and a read flag indicating that said frame is being read or waiting for reading; and
   a write cell number area for indicating a storage area of said first memory where cells corresponding to the frame are subsequently stored, and
   wherein said state number area and said write cell number area are provided for each connection.

8. An ATM cell processing apparatus according to claim 1, wherein said control unit conducts writing of partial cell data into said first memory and reading of information from said first memory alternately using integer times as many clock pulses as the number of said banks obtained by division of the first memory into banks, and conducts said writing and said reading with a time difference equivalent to a fixed number of clock pulse intervals.

9. An ATM cell processing apparatus, comprising:
   a first memory formed of a plurality of banks for temporarily storing ATM cells to disassemble a frame received from a plurality of input lines into ATM cells;
   a second memory for storing frame management information to manage a state of said frame stored in said first memory for each connection; and
   a control unit, wherein said control unit comprises:
      a control mechanism for dividing said ATM cell into a plurality of partial cell data according to a division number based on an excess capacity of said plurality of banks of said first memory, successively writing partial cell data into respective banks of said first memory according to said frame management information stored in said second memory, and in response to arrival of one frame, successively reading parts of said frame from respective banks of said first memory to produce said ATM cells.

10. An ATM cell processing apparatus according to claim 9, wherein said first memory is assigned for respective connections, and is divided into a plurality of areas for storing frames of respective connections, and each of said areas for storing a frame is divided into a plurality of cell storing areas.

11. An ATM cell processing apparatus according to claim 9, wherein said first memory includes a plurality of DRAMs for said banks.

12. An ATM cell processing apparatus according to claim 11, wherein each of said DRAMs is embedded physically in the same chip as said control unit.

13. An ATM cell processing apparatus according to claim 9, wherein said first memory has as many banks as said division number of said partial cell data.

14. An ATM cell processing apparatus according to claim 13, wherein the number of said banks of said first memory is one of a group of 4, 8 and 16.

15. An ATM cell processing apparatus according to claim 9, wherein said second memory comprises:
   a state number area for indicating the state of said frame using a write flag indicating that said frame is being produced and a read flag indicating that said frame is being read or waiting for reading; and
   a write cell number area for indicating a storage area of said first memory where cells corresponding to the frame are subsequently stored, and
   wherein sa id state number area and said write cell number area are provided for each connection.

16. An ATM cell processing apparatus according to claim 9, wherein said control unit conducts writing of partial cell data into said first memory and reading of information from said first memory alternately using integer times as many clock pulses as the number of said banks obtained by division of the first memory into banks, and conducts said writing and said reading with a time difference equivalent to a fixed number of clock pulse intervals.

* * * * *